United States Patent [19]

Akagi et al.

[11] Patent Number: 4,999,215
[45] Date of Patent: Mar. 12, 1991

[54] METHOD FOR MANUFACTURING POLYIMIDE THIN FILMS BY PLASMA POLYMERIZATION

[75] Inventors: Yoshiro Akagi, Osaka; Mariko Ishino; Atsuhisa Inoue; Shigeru Kaminishi; Hiroshi Taniguchi, all of Nara, Japan

[73] Assignee: Sharp Kabushiki Kaisha, Osaka, Japan

[21] Appl. No.: 459,375

[22] Filed: Dec. 29, 1989

[30] Foreign Application Priority Data

Dec. 29, 1988 [JP] Japan ................. 63-332347

[51] Int. Cl.⁵ ............... B05D 3/06; B32B 15/08; B32B 17/10; B32B 27/34
[52] U.S. Cl. ........................ 427/41; 427/44; 427/39; 427/38; 427/166; 427/255.6; 427/248.1; 428/435; 428/458
[58] Field of Search ............ 427/41, 44, 39, 38, 427/165, 166, 255.6, 248.1; 428/435, 458; 118/723

[56] References Cited

U.S. PATENT DOCUMENTS

| 4,560,641 | 12/1985 | Kokaku et al. | 430/312 |
| 4,624,867 | 11/1986 | Irjima et al. | 427/255.6 |
| 4,664,935 | 5/1987 | Strahl | 427/38 |
| 4,713,288 | 12/1987 | Kokaku et al. | 428/336 |
| 4,743,327 | 5/1988 | Dehaan et al. | 156/272.6 |
| 4,808,468 | 2/1989 | Nojiri et al. | 428/220 |

Primary Examiner—Norman Morgenstern
Assistant Examiner—Roy V. King
Attorney, Agent, or Firm—Birch, Stewart, Kolasch & Birch

[57] ABSTRACT

A method of manufacturing a polyimide thin film is disclosed which comprises supplying vapors of a polyimide starting material comprising a plurality of polyimide forming monomers into a plasma atmosphere, transferring the ionized polyimide starting material, under an electric field, to the surface of a glass or metallic substrate and depositing the material thereon, and heating the same during or after deposition, thereby forming a polyimide thin film as an orientation film on the substrate.

14 Claims, 3 Drawing Sheets

METHOD FOR MANUFACTURING POLYIMIDE THIN FILMS BY PLASMA POLYMERIZATION

BACKGROUND OF THE INVENTION

1. Field of the Invention

The present invention concerns a method for manufacturing a polyimide thin film which can be used as an orientation film for liquid crystals, substrates for forming organic compound crystal thin films, etc., and an apparatus for the same.

2. Description of the Prior Art

Recently, liquid crystal displays have been increasingly utilized and, since the display is realized by controlling the orientation of the liquid crystal molecules on the surface of a substrate, or orientation film, improvement in the performance of the orientation film for liquid crystals has become important.

Orientation of liquid crystal molecules relative to a substrate can be generally classified into three types: (1) in parallel with, (2) vertical to or (3) slanted to the surface of a substrate, and various kinds of display have been actually attained by the combination of (1), (2) and (3) in a practical point of view. These situations generally depend on a physicochemical effect between the surface of the substrate and liquid crystal molecules, or the direction and magnitude of various elastic forces accompanying the orientation of the liquid crystal molecules on the surface of the substrate, etc. The physicochemical effect is formed due to Van der Waals force between a coating film or surface treated material on the surface of the substrate and liquid crystal molecules, polarization ratio, chemical bonding force, etc. For instance, it has been known that liquid crystal molecules can easily be oriented in a certain direction relative to the surface of the substrate by applying a physical or configurational treatment to the surface of the substrate, which has been utilized generally. This technique is attributable to a low elastic energy caused by the distortion of the liquid crystal molecules when they are oriented in the direction of concavo-convex stripe traces formed on the surface of a substrate. Further, considering the application of liquid crystals to a display device, the elastic property of the liquid crystals per se is an important factor in addition to the factor on the surface of the substrate.

Then, referring to a method of manufacturing an orientation film (substrate) for liquid crystal molecules utilizing such various kinds of forces exerted on each other, a method of orienting liquid crystals by use of a chemically modified surface of an inorganic substrate such as glass thereby providing a physico-chemical force can include (1) a method of obtaining an orientation film by coating a surface-active-agent such as a phospholipid material which is an amphiphatic material (e.g., lecithin) or a silane compound or a synthetic polymeric material such as polyamide, polytetrafluoroethylene, etc., on a substrate for liquid crystals, (2) a method of obtaining an orientation film by depositing an inorganic chemical absorbent of higher heat resistance and relatively great endurance such as a carboxylate-chromium complex on a substrate for liquid crystals, etc. On the other hand, a rubbing method is known which includes rubbing a glass substrate with fresh cloth or jewel abrasive and utilizing the fact that the orientation of liquid crystal molecules is sensitive to the concave-convex surface of the substrate. Another method of mechanically inprinting concavo-convex stripe traces is known using a replica and thereby obtaining an orientation substrate (orientation film). Further, liquid crystal molecules may also be oriented by merely forming a geometrical pattern and, for example, there has been reported a method of forming an orientation film by utilizing a sort of uneven vapor deposition formed by oblique vapor deposition of an inorganic element (Au) or an inorganic compound ($SiO_2$). In the oblique vapor deposition method, since the mean free path of atoms or molecules in vacuum is generally as long as from several tens of centimeters to several meters, uneven vapor deposition is characteristically formed only in one direction. It has been known from an example of research report that the mean height of these geometrical patterns of less than 100 Angstroms can sufficiently orient the liquid crystals, and the orientation film formed by the oblique vapor deposition method avoids concerns about whether an electroconductor is used or not. There has also been a method of obtaining an orientation film by forming concavoconvex stripe traces by the combination of a physical method subsequent to the chemical processing such as applying oblique etching by ion beams to the surface coated with a surface active agent.

In orientation films for liquid crystals in which various surface active materials are coated on a transparent glass substrate, there have been problems in view of practical use since the materials used so far are poor in durability and, with regard to a glass substrate attached to a transparent electrode or display element, a lot of metals, polymeric compounds, non-metal elements, etc. are laminated on the substrate which worsens the durability and cause unevenness in the adhesion. Further an attempt has been made to determine the technical factors necessary for the production of liquid crystal orientation films prepared by mechanically printing the concavo-convex stripe traces since the manufacture is simple in principle. However, since this is mechanical rubbing, there are several problems such as unevenness upon printing, poor reproducibility, intrusion of impurities, etc. These problems have become more severe as higher quality and reliability have been demanded for the liquid crystal orientation film.

For overcoming the foregoing problems, it has been developed in recent years a method of forming an aromatic polyimide series thin film of excellent heat resistance, chemical stability, dielectric property, etc. on a glass substrate attached to a transparent electrode or on a glass substrate attached to various display elements and, thereafter, applying convavoconvex stripe traces mechanically, thereby forming an orientation film. The method is excellent over other various methods in that substrates made of various materials can be chemically modified uniformly and then subsequent formation of concavo-convex stripe traces can be attained at a relatively good reproducibility, and the durability of the liquid crystal orientation film can progress remarkably by the development of this method. However, the geometrical shape of the liquid crystal orientation film has become complicated more and more along with increase in the integrated circuit density and the performance of devices, and a technique capable of forming a polyimide thin film with no unevenness due to a uniform thickness and with good adhesion irrespective of positions has become an important factor for attaining the demanded performance of liquid crystal display devices. For instance, in a polyimide thin film formed by a coating method, drying and heat curing a polyamic acid solution on a substrate for liquid crystals, the thickness of the film at protruded portions such as electrodes or display devices is reduced, the unevenness in the coating thickness upon forming the liquid crystal orientation film causes unevenness in the formation of concavoconvex stripe traces, separation of the orientation film, etc. which often leads to failed liquid crystal orientation, or electrical leakage to result in fatal troubles, which can not be overlooked.

SUMMARY OF THE INVENTION

The present invention has been accomplished for overcoming the foregoing problems and it is an object thereof to provide a method and an apparatus for manufacturing a polyimide thin film showing no reduction in the film thickness even in the protruded portions at the surface of a substrate forming a thin film, which is uniform irrespective of the shape of the thin film forming surface and excellent in adhesion.

The present inventors have made an earnest study on the method of manufacturing a polyimide thin film having a film thickness which is uniform and free from reduction of thickness irrespective of the shape on the surface of a substrate, for example, at protruded portions and which is of excellent adhesion and have accomplished a present invention based on the finding that a polyimide thin film deposited in a gas phase to the protrusions of the substrate is free from reduction of the film thickness as compared with flat portions and that a polyimide thin film prepared by transferring, under an electric field, an ionized polyimide forming starting material in a gas phase onto the substrate and depositing thereon has high adhesion.

The present invention concerns a method of manufacturing a polyimide thin film which comprises supplying vapors of a polyimide starting material comprising a plurality of polyimide forming monomers into a plasma atmosphere, transferring the ionized polyimide starting material, under an electric field, to one surface of a substrate and depositing thereon, and heating the same during or after deposition, thereby forming a polyimide thin film on the substrate. Also, it relates to an apparatus for manufacturing a polyimide thin film, comprising:

(a) a vacuum chamber incorporating a substrate holder for holding a substrate in the holder providing heating means, (b) a polyimide starting material supply means having a plurality of containers each opened at the upper portion and containing a polyimide forming monomer and heating means capable of evaporating the monomer, thereby being capable of supplying vapors of the polyimide starting material to the inside of the vacuum chamber, (c) plasma generating means for ionizing the vaporous polyimide starting material supplied from the polyimide starting material supply means to the inside of the vacuum chamber and (d) electric field forming means capable of transferring under an electric field, the polyimide starting material ionized by the plasma generating means to the surface of the substrate.

DESCRIPTION OF THE PREFERRED EMBODIMENT

Figure 1:
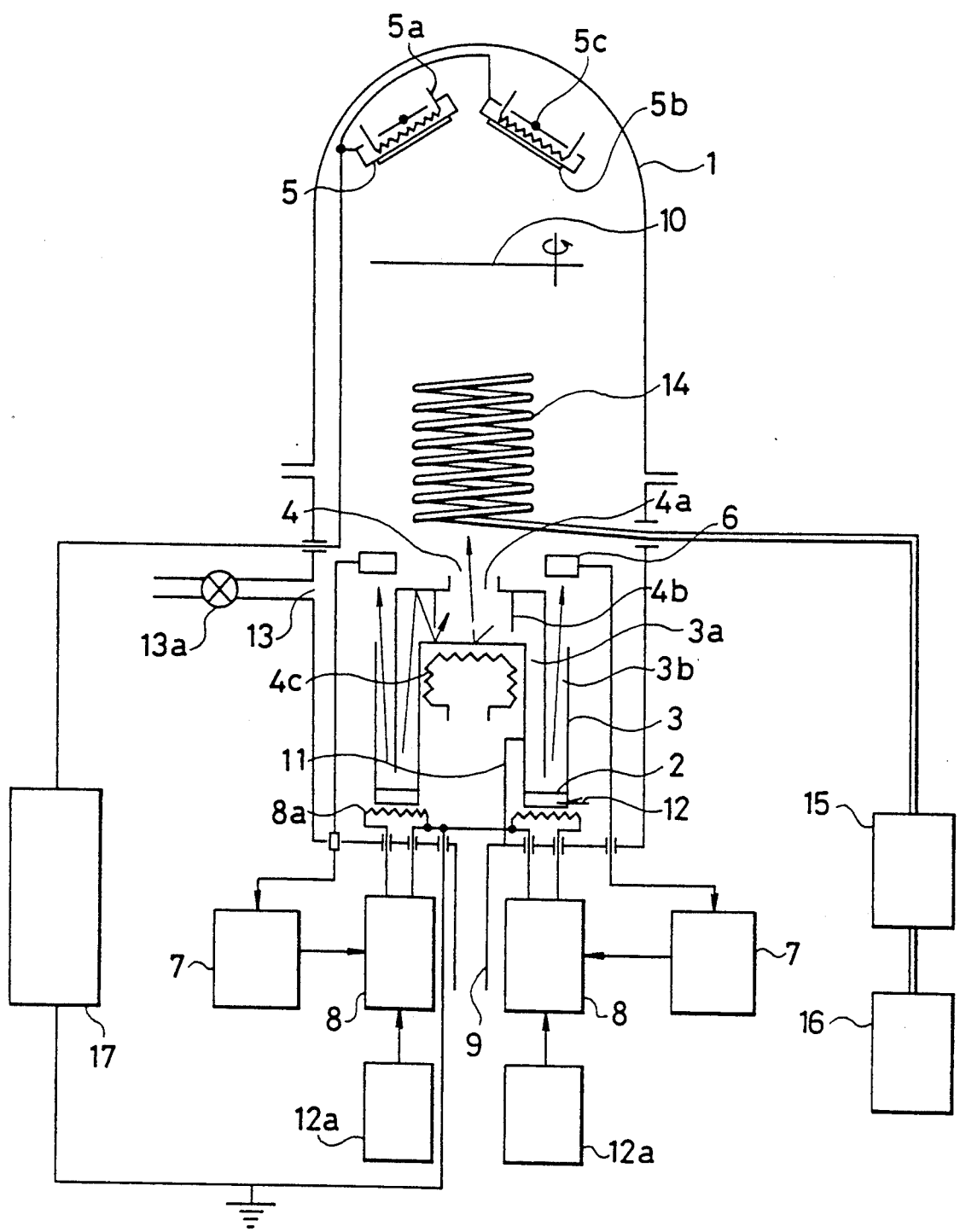
FIG. 1 is an explanatory view of the apparatus for manufacturing a polyimide thin film used in an embodiment of the present invention.

A method of manufacturing a polyimide thin film according to the present invention will now be described at first.

In the present invention, vapors of a plurality of polyimide forming monomers as polyimide starting material are supplied and ionized in a plasma atmosphere. The polyimide forming monomers include, e.g., the combination of acid anhydrides and amine compounds. Examples of the acid anhydrides are dianhydrides which are known to form polyimides, such as pyromellitic dianhydride, dianhydrides formed from two moleculars of trimellitic acid, phthalic acid or like polycarboxylic acid with or without the intervention of the group —CH—, —(CH$_2$)n—, —0—, —(CF$_2$)n— or —CO—, or other cyclocyclic, bicyclic, polycyclic or spiro-hydrocarbon dianhydrides. Examples of the amine compounds are amine compounds which are known to form polyimides, such as aromatic diamines, specifically dianiline series compounds represented by the formula: H$_2$N—C$_6$H$_4$—X—C$_6$H$_4$—NH$_2$ [in which X=—CH$_2$—, —SO$_2$—, —(CH$_2$)$_n$—, —C(CH$_3$)$_2$—, —O—, —(CF$_2$)$_n$—, —SiY$_2$—O—SiY$_2$ (Y: hydrophobic group such as CH$_3$)].

The vapors are the polyimide starting material prepared by heating to evaporate the polyimide forming monomers, mixing the monomers each at a stoichiometrical ratio capable of forming a polyimide, for example, at a molar ratio of the acid anhydride and the amine usually at 1/0.9–0.9/1 and then reacting them to each other. The plasma atmosphere is formed by applying a radio frequency usually at 10–20 MHz to a coil electrode or RF electrode in a vacuum atmosphere and introducing a plasma-forming gas at a reduced pressure usually or 10$^{-3}$–10$^{-5}$ Torr and then the supplied polyimide starting material can be ionized.

In the present invention, the ionized polyimide starting material is deposited on the surface of a substrate by transferring the material, under electric field, to the surface. As the substrate, there can be used, for example, an aluminum, copper or like metallic substrate, or a quartz glass, 7059 glass or like glass substrate. A substrate providing a transparent electrode or display element which is uneven on the surface is also usable. The electric field transfer can be carried out, for example, by opposing a negative electrode plate applied with a voltage usually of 50–200 V in the direction of supplying the ionized polyimide starting material usually within an angle of 45° to 90° and disposing the substrate on the negative electrode plate. Then, the ionized polyimide starting material can be transferred under acceleration to the surface of the substrate and deposited thereon. The ionized polyimide starting material can be deposited with no unevenness to the surface of the substrate by disposing the surface of the substrate at an angle of about 90° relative to the direction of supplying the starting material. Meanwhile, by disposing the substrate at 45°–88°, preferably, 80°–85°, concaveconvex stripe traces comprising uneven deposition only in one direction can be formed and deposited to the surface of the substrate.

In the present invention, a polyimide thin film is formed on the substrate by heating during or after deposition. The polyimide starting material deposited on the substrate can be converted into a polyimide thin film with a film thickness usually of 0.01–0.5 μm by heating at a temperature usually within the range of 150° C. to 350° C. for 120 to 5 min.

Thus obtained polyimide thin film may be applied with rubbing as required and can be used as an orientation film for liquid crystals. In addition, it can be used, for example, as a substrate for forming an organic single crystal thin film such as made of long-chained alkyl carboxylic acid salt and derivative thereof.

An apparatus for manufacturing the polyimide thin film according to the present invention will now be described.

In the present invention, the apparatus comprises (a) a vacuum chamber incorporating a substrate holder for holding a substrate and heating means. The substrate holder is used for disposing, thereon, a substrate to which a polyimide thin film is to be formed, transferring ionized polyimide starting material, under electric field, onto the substrate and converting the polyimide starting material into a polyimide during deposition of the polyimide starting material to the substrate. The substrate can be disposed to the direction of supplying the ionized polyimide starting material at an angle selected within a range of 45° to 90°. For instance, by disposing slantwise at an angle of 80° to 85°, concavo-convex stripe traces comprising uneven vapor deposition only in one direction capable of orienting liquid crystals can be formed. Further the polyimide starting material ionized by the application of the voltage to the negative electrode can be transferred to the substrate, by accelerating it with application of electric field. Further, the polyimide starting material can be converted into a polyimide in the course of deposition by heating the back of the substrate to 150°–350° C. The vacuum chamber is used for forming a plasma atmosphere that ionizes vapors of the polyimide starting material comprising a plurality of monomers, which can be evacuated usually to a vacuum degree of lower than $10^{-6}$ Torr by evacuating from an exhaust port by means of a vacuum pump.

In the present invention, the apparatus comprises (b) a plurality of containers each opened at the upper portion and containing polyimide forming monomers and heating means capable of evaporating the monomers and having polyimide starting material supply means capable of supplying the vapors of polyimide starting material comprising the monomers to the inside of the vacuum chamber. The plurality of containers opened at the upper portion are used for containing the polyimide forming monomers and they can be made, for example, of quartz glass of stainless steel, in which at least one of the acid anhydrides and at least one of the amine compounds can be contained respectively. The heating means is used for evaporating the monomers at a predetermined rate and the monomers can be evaporated at a predetermined rate by disposing a heater below the containers and heating the monomers usually to 100–300° C. and controlling the heating temperature. The temperature can be controlled by disposing a film thickness sensor to the upper portion of the container, measuring the evaporation rate of the monomer vapors and lowering the heating temperature of the heating means if the evaporation rate is greater than a predetermined rate, while elevating the heating temperature if it is lower than the predetermined rate. For instance, more effective control can be attained by establishing an automatic control system by forming a negative feedback loop for the film thickness sensor and the power source of the heating means by way of a film thickness control device. The polyimide starting material supply means can supply the monomer vapors evaporated each at a predetermined rate to the inside of the vacuum chamber.

In the present invention, the apparatus comprises plasma generating means for ionizing the vaporous polyimide starting material supplied from the polyimide starting material supply means to the inside of the vacuum chamber. The plasma atmosphere can be formed by using, for example, an inductive type, capacitance type or parallel flat plate type plasma device, evacuating the inside of the device, for example, usually to $10^{-5}$–$10^{-6}$ Torr, applying radiowave at a frequency usually of 10–20 MHz to a coil electrode or RF electrode of the plasma device and introducing a plasma-forming gas such as argon thereby forming a vacuum degree usually of $10^{-3}$–$10^{-5}$ Torr and the vaporous polyimide starting material supplied to the inside can be ionized.

In the present invention, the apparatus comprises electric field forming means capable of transferring, under electric field, the polyimide starting material ionized by the plasma generating means to the surface of the substrate. The electric field forming means is used for transferring, under electric field, the ionized polyimide starting material to the surface of the substrate, which can be conducted, for example, by applying a DC voltage usually at 50–200 V to the substrate holder.

The polyimide starting materials are ionized in the plasma atmosphere and deposited on the surface of the substrate under acceleration by electric field transfer and then applied to a heat treatment, to be converted into a polyimide thin film of excellent adhesion.

EXAMPLE 1

As shown in FIG. 1, a substrate holder 5 was attached with a substrate 5b made of quartz glass having a protrusion of 10 mm length, 10 mm width and 1 mm height. A rotational portion 5c was adjusted such that the substrate made an angle of 90° relative to the direction of supplying the polyimide forming monomer and pyromellitic acid dianhydride (PMDA) and oxydianiline (ODA) were charged each in an appropriate amount to two monomer containers 3 respectively. Then, the inside was evacuated from an exhaust port 9 to reduce the pressure in the vacuum chamber 1 to a vacuum degree of $10^{-5}$ Torr. Then, RF current at 13 MHz was supplied from an RF power source 16 to an RF coil 14 by way of a matching unit 15, while argon gas was introduced from a gas introduction port 13 to $1 \times 10^{-4}$ Torr. Then, glow discharge was started to form a plasma atmosphere at the inside of the vacuum chamber 1, the surface of the substrate 5b was cleaned with the plasma for several minutes and the plasma atmosphere was maintained. Then, a voltage at 130 V was applied to the substrate holder 5 by an electric field transfer DC. power source 17 for the ionized polyimide starting material such that the substrate holder 5 served as a negative electrode. Electric current was supplied to a heater 5a to heat and maintain the substrate 5b at 200° C. Then, each of the monomers was heated to evaporate by supplying an electric current to a heater 8a from a power source 8. The heating temperature was controlled by adjusting the power of the power source 8 such that each of the monomers was evaporated by an equi-molar amount while detecting the vapor deposition rate converted by a film thickness monitor 7 through a film thickness sensor 6(quartz oscillator). When the evaporation was stabilized, a shutter 10 was opened, ions of pyromellitic acid dianhydride (PMDA), oxydianiline (ODA) and polymer precursor thereof ionized in the plasma atmosphere were accelerated by the substrate holder 5 applied with a negative voltage and then vapor deposited to a film thickness of 1000 Å on a substrate 5b disposed on the substrate holder and heated to 200° C.

Figure 2A:
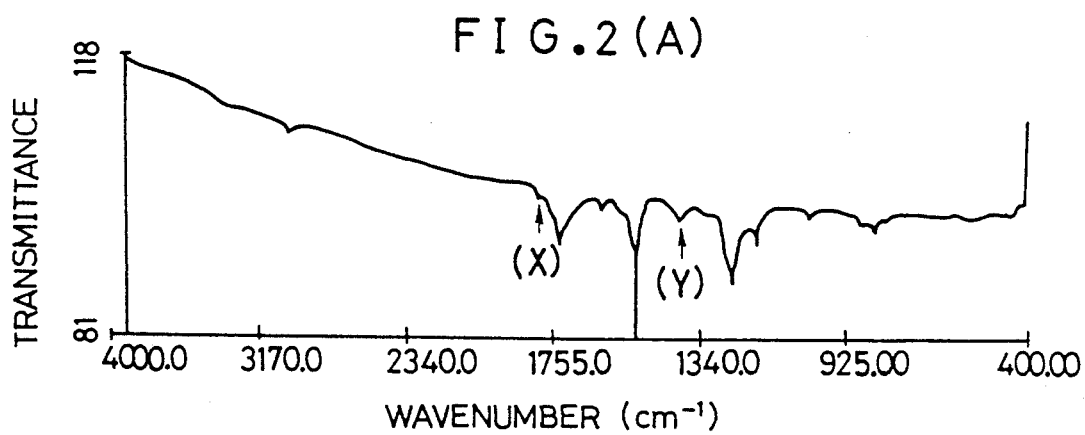
FIG. 2 is IR spectrum charts for polyimide thin films (A) and (B) as produced by the present invention and a polyimide starting material film (C) in which (A), (B) and (C) are, respectively, carts at the heating temperatures of 200° C., 350° C. and 100° C.

As shown in FIG. 2(A), polyimide peaks (X) and (Y) were observed by IR spectroscopy. It has been confirmed that the polyimide thin film shows no thickness reduction even at protruded edges and has uniform film thickness irrespective of the surface shape of the substrate. Further, as shown in Table 1, the polyimide thin film is excellent regarding adhesion to the substrate and acid resistance over the polyimide thin film formed by a vapor deposition or coating process shown in comparative examples described below.

TABLE 1

|  | Example | Comparative Example 1 (vapor deposition) | Comparative Example 2 (coating) |
| --- | --- | --- | --- |
| Adhesion | ⊚ | Δ | ○ |
| Acid resistance | ⊚ | Δ | ○ |

⊚: excellent
○: good
Δ: somewhat poor
*Adhesion: was judged by cross-wise scratching the surface of the substrate for liquid crystals with a needle, appending an adhesive tape thereon, peeling the tape and then measuring the amount of the peeled polyimide thin film.
*Acid resistance: was measured by immersing the substrate into a concentrated sulfuric acid at 30° C. and measuring the time till the polyimide thin film was peeled off.

Then, the surface of the polyimide thin film on the substrate obtained in the same manner as above was rubbed in one direction by a silicon cloth to apply a rubbing treatment, thereby forming an orientation film for liquid crystals.

Figure 3:
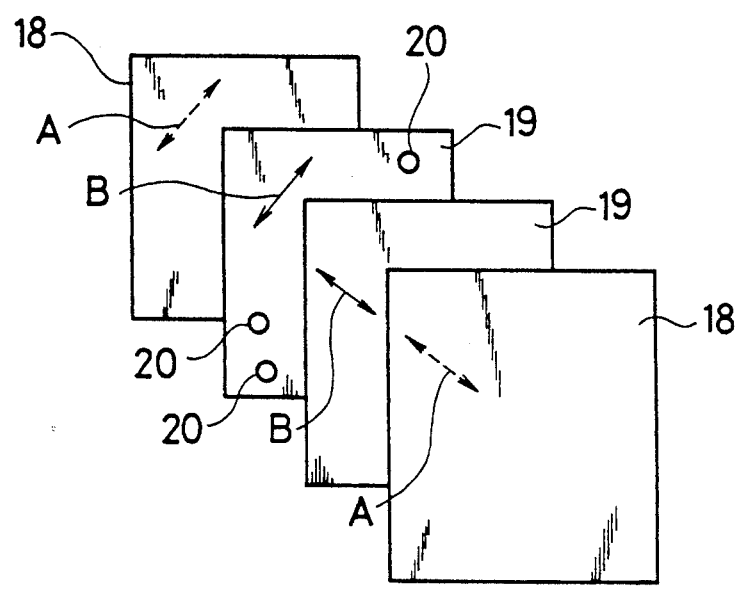
FIGS. 3 and 4 are, respectively, explanatory views for a display device for evaluating the performance of the orientation films assembled in an embodiment of the present invention.
Figure 4:
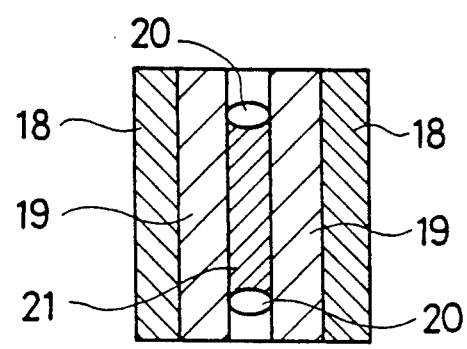

Then, a liquid crystal display device as shown in FIGS. 3 and 4 was assembled by using the orientation film thus obtained.

In FIGS. 3 and 4, a pair of substrates 19 forming orientation films for liquid crystals were disposed such that the direction of concavo-convex stripe traces of the orientation film (polyimide thin film) thereon were in perpendicular to each other and that the surfaces of the orientation films were opposed to each other. The orientation films were disposed being spaced apart by 5–10 μm by a glass spacer 20 and liquid crystal material 21 [p-methoxybenzylidene-p-n-butylaniline (MBBA)] was sealed between the orientation films.

Then, when a polarization test was conducted while disposing polaroid plates having the same polarization direction as the direction of the concavo-convex stripe traces of the orientation films, respectively, on each of the orientation film-formed substrates 19 for liquid crystals, it has been confirmed that liquid crystals were apparently oriented in the direction of the concavo-convex stripe traces in a single domain within the liquid crystal display device.

EXAMPLE 2

A this film was formed in the same manner as in Example 1 except for changing the temperature for the substrate disposed on the substrate holder to 350° C.

Figure 2B:
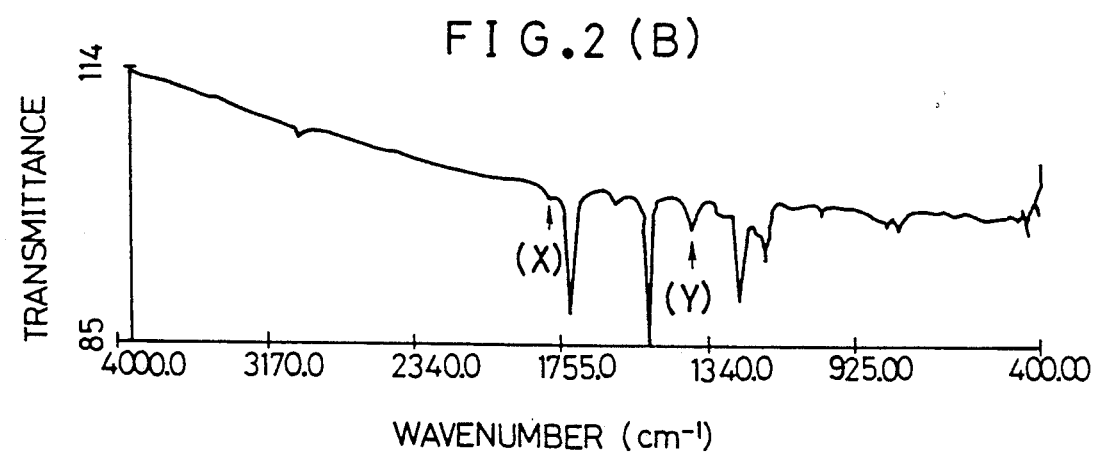

As shown in FIG. 2(B), polyimide peaks (X) and (Y) were observed by IR spectroscopy for the resultant thin film and the peaks were greater than the absorption obtained in Example 1.

EXAMPLE 3

A thin film was formed in the same manner as in Example 1 except for changing the temperature for the substrate disposed on the substrate holder to 100° C.

Figure 2C:
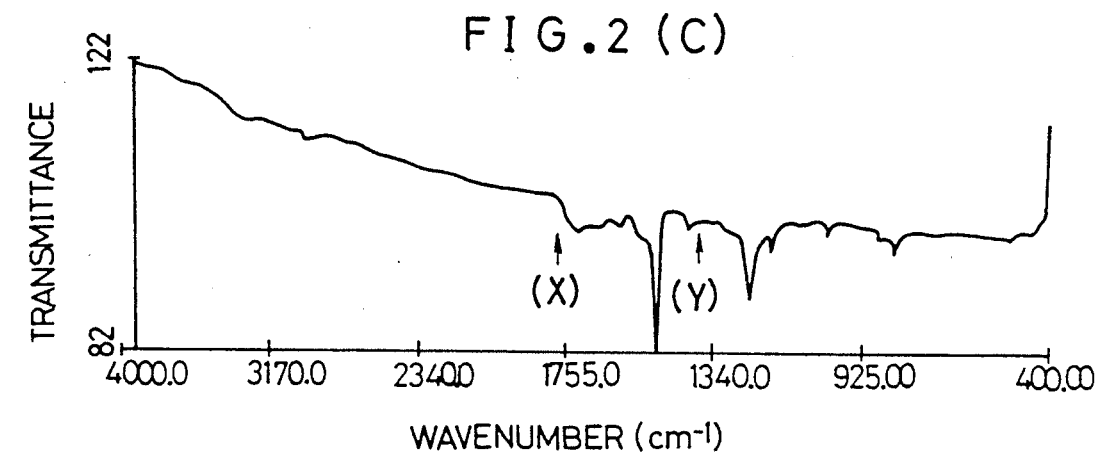

As shown in FIG. 2(C), no polyimide peaks were observed by IR spectroscopy for the resultant thin film. Then, when the thin film was heated at 350° C. for 5 min. same peaks as shown in FIG. 2(B) were observed.

COMPARATIVE EXAMPLE 1

A polyimide thin film was formed by vapor deposition on a quartz glass substrate in the same manner as in Example 1 except for using an atmosphere at a reduced pressure of $10^{-5}$ Torr instead of using the plasma atmosphere.

As shown in Table 1, the resultant polyimide thin film was poor in the strength of adhesion to the quartz glass substrate and the acid resistance.

COMPARATIVE EXAMPLE 2

A polyamic acid solution was prepared by dissolving 11.0 g of pyromellitic acid dianhydride (PMDA) and 10.0 g of oxydianiline (ODA) into 50–100 g of dimethylacetoamide and heating to 120° C. for 60 min. Then, the solution of the polyamic acid was coated on the same quartz glass substrate as that in Example 1 by means of a spin coating method, drying at 100° C. for 10 min and then applied with a heat treatment at 200° C. for 0.5 to 1 hour to form a polyimide thin film. As shown in Table 1, although the resultant polyimide thin film showed satisfactory adhesion to the substrate and the acid resistance, the film thickness which was about 2000 Å in the recessed portion of the substrate was reduced to about 300 Å in the protruded edge portion, thus showing not-uniform thickness.

According to the present invention, it is possible to provide a method of manufacturing a polyimide thin film which is uniform irrespective of the shape of the thin film forming surface, i.e., with no reduction of the film thickness even in the protruded portions on the thin film forming surface and is excellent in adhesion, as well as an apparatus used therefor. By using the manufacturing method and the apparatus according to the present invention, it is possible to produce highly reliable liquid crystal display device, etc. with satisfactory orientation for liquid crystal material.

What we claimed is:

1. A method of manufacturing a polyimide thin film which comprises supplying into a plasma atmosphere vapors of a polyimide starting material comprising a plurality of polyimide forming monomers including the combination of an acid anhydride and an amine compound which are mixed at a stoichiometric ratio capable of forming a polyimide, whereby ionized polyimide starting material is formed, transferring the ionized polyimide starting material, under an electric field, to the surface of a substrate comprising metal of glass and depositing said ionized polyimide starting material thereon, and heating said substrate during or after deposition, thereby forming one polyimide thin film on the substrate.

2. The method of claim 1, in which the plasma atmosphere is an argon plasma atmosphere.

3. The method of claim 1, in which the transfer of the ionized polyimide starting material to the substrate is conducted by applying a DC. voltage at 50-200 V, while the surface of the substrate is disposed at a prescribed angle, relative to the direction of supplying the polyimide starting material.

4. The method of claim 3, in which the prescribed angle is in the range of 45° to 90°.

5. The method of claim 1, in which the heating is conducted at a temperature between 50° C. to 350° C.

6. The method of claim 1, in which the polyimide forming monomers are pyromellitic dianhydride and oxydianiline.

7. The method of claim 1, in which said acid anhydride and amine compound are mixed at a molar ratio of 1/0.9–0.9/1.

8. The method of claim 1, in which said substrate is selected from the group consisting of aluminum, copper, and quartz glass.

9. The method of claim 1, in which said plasma atmosphere is formed by applying a radio frequency of 10-20 MHz to a coil electrode or RF electrode in a vacuum atmosphere and introducing a plasma-forming gas at a reduced pressure of $10^{-3}$ to $10^{-5}$ Torr.

10. The method of claim 1, in which the heating is conducted at a temperature within the range of 150° C. to 350° C.

11. The method of claim 1, in which said acid anhydrides is selected from the group consisting of pyromellitic dianhydrides and dianhydrides formed from two molecules of trimellitic acid or phthalic acid; and said amine compound is represented by the formula $H_2N-C_6H_4-X-C_6H_4NH_2$ wherein X is $-CH_2-$, $-SO_2-$, $-(CH_2)_n-$, $-C(CH_3)_2-$, $-O-$, $-(CF_2)_n-$ and $SiY_2-O-SiY_2$ wherein Y is a hydrophobic group.

12. The method of claim 1, in which said polyimide thin film is formed at a thickness of 0.01 to 0.5 μm.

13. The method of claim 3, in which said plasma atmosphere is formed by applying a radio frequency of 10-10 MHz to a coil electrode or RF electrode in a vacuum atmosphere and introducing a plasma-forming gas at a reduced pressure of $10^{-3}$ to $10^{-5}$ Torr.

14. The method of claim 13, in which the heating is conducted at a temperature between 50° C. to 350° C.

* * * * *